(12) United States Patent
Bjerke (10) Patent No.: US 10,538,900 B2
(45) Date of Patent: Jan. 21, 2020

(54) WEAR MEMBER FOR A WORK TOOL

(71) Applicant: Caterpillar Inc., Peoria, IL (US)

(72) Inventor: Nathan Bjerke, Peoria, IL (US)

(73) Assignee: Caterpillar Inc., Peoria, IL (US)

( * ) Notice: Subject to any disclaimer, the term of this patent is extended or adjusted under 35 U.S.C. 154(b) by 0 days.

(21) Appl. No.: 15/826,942

(22) Filed: Nov. 30, 2017

(65) Prior Publication Data

US 2019/0161945 A1 May 30, 2019

(51) Int. Cl.
*E02F 9/28* (2006.01)

(52) U.S. Cl.
CPC .................... *E02F 9/2883* (2013.01)

(58) Field of Classification Search
CPC ......... E02F 9/28; E02F 9/2808; E02F 9/2858; E02F 9/2883; E02F 9/2891
See application file for complete search history.

(56) References Cited

U.S. PATENT DOCUMENTS

| | | | |
|---|---|---|---|
| 5,653,048 A | 8/1997 | Jones et al. | |
| D676,066 S * | 2/2013 | Attwood | D15/28 |
| D676,067 S * | 2/2013 | Attwood | D15/28 |
| 8,397,405 B2 | 3/2013 | Harder et al. | |
| 9,309,651 B2 | 4/2016 | Jeske et al. | |
| 9,322,150 B2 | 4/2016 | Johnston et al. | |
| D758,459 S * | 6/2016 | Hooijmans | D15/28 |
| 9,447,564 B2 * | 9/2016 | Kunz | E02F 9/2883 |
| 9,469,974 B2 * | 10/2016 | Guimaraes | E02F 9/2825 |
| D788,826 S * | 6/2017 | Serrurier | D15/28 |
| 9,834,909 B2 * | 12/2017 | Guimaraes | E02F 9/2825 |
| 9,903,101 B2 * | 2/2018 | Serrurier | E02F 9/2825 |
| 9,920,504 B2 * | 3/2018 | Bierwith | E02F 9/2841 |
| 9,995,022 B2 * | 6/2018 | Hooijmans | E02F 3/60 |
| 2005/0172524 A1 | 8/2005 | Grant | |
| 2013/0047475 A1 * | 2/2013 | Bierwith | E02F 3/40 37/455 |
| 2013/0081835 A1 * | 4/2013 | Rivera | E02F 9/2875 172/719 |
| 2013/0145659 A1 * | 6/2013 | LaHood | E02F 3/8152 37/453 |
| 2014/0230293 A1 * | 8/2014 | Lunn | E02F 3/40 37/444 |
| 2014/0325881 A1 * | 11/2014 | Plouzek | E02F 9/2816 37/455 |
| 2014/0360061 A1 * | 12/2014 | Kunz | E02F 9/2833 37/455 |
| 2015/0013134 A1 | 1/2015 | Zenier et al. | |
| 2015/0107075 A1 | 4/2015 | Clarke et al. | |
| 2015/0376872 A1 * | 12/2015 | Bierwith | E02F 9/2891 37/456 |

(Continued)

*Primary Examiner* — Matthew Troutman
(74) *Attorney, Agent, or Firm* — Oblon, McClelland, Maier & Neustadt (57) ABSTRACT

A wear member for attachment with a work tool includes a body portion configured to be coupled to the work tool. The body portion includes a first outer surface, a second outer surface positioned opposite the first outer surface, a coupling surface configured to engage the work tool, and a wear surface disposed along a front edge of the body portion. The wear member further includes a lifting passage extending through the body portion from the first outer surface to the second outer surface and is positioned between the wear surface and the coupling surface.

17 Claims, 5 Drawing Sheets

(56) References Cited

U.S. PATENT DOCUMENTS

2017/0009431 A1    1/2017  Kunz et al.
2017/0321396 A1*  11/2017  Zenier .................... E02F 9/2883
2017/0328036 A1*  11/2017  Bilal ..................... E02F 9/2825

* cited by examiner

WEAR MEMBER FOR A WORK TOOL

TECHNICAL FIELD

The present disclosure relates generally to a wear member for a work tool of a machine and, more particularly, to the wear member having a lifting passage that facilitates a lifting of the wear member for assembly or dis-assembly with the work tool.

BACKGROUND

Work machines such as excavators, and the like, include work tools to perform work at a work site. The work tool generally includes various wear members mounted to edges of the work tool to protect the work tool from wear. For example, teeth, shrouds, and side protection bars are coupled to the edges of a bucket of the excavator. The wear members are generally provided with lifting hooks to facilitate lifting of the wear members during assembly or dis-assembly of the wear members. Generally, the lifting hook is a protrusion extending from an outer surface of a body of the wear member to facilitate an attachment of a lifting strap. However, the lifting hooks are susceptible to wear due to placement in a material flow path, and are often sheared off the wear member before the end of service life.

US Published Application number 2015/0013134A1 discloses a lifting connector that is removably coupled with a wear part for an earth moving machine. The lifting connector is inserted into a hole formed into the wear part for coupling with the wear part when a lifting of the wear part is needed.

SUMMARY OF THE DISCLOSURE

In one aspect of the present disclosure, a wear member for attachment with a work tool is disclosed. The wear member includes a body portion configured to be coupled to the work tool. The body portion includes a first outer surface, a second outer surface positioned opposite the first outer surface, a coupling surface configured to engage the work tool, and a wear surface disposed along a front edge of the body portion. The wear member further includes a lifting passage extending through the body portion from the first outer surface to the second outer surface and is positioned between the wear surface and the coupling surface.

In another aspect of the present disclosure, a work tool assembly is disclosed. A work tool assembly includes a work tool and a wear member including a body portion and a lifting passage. The wear member is coupled to the work tool. The body portion includes a first outer surface, a second outer surface positioned opposite the first outer surface, a coupling surface engaged with the work tool, and a wear surface disposed along a front edge of the body portion. The lifting passage extends through the body portion from the first outer surface to the second outer surface and is positioned between the wear surface and the coupling surface.

DETAILED DESCRIPTION

Figure 1:
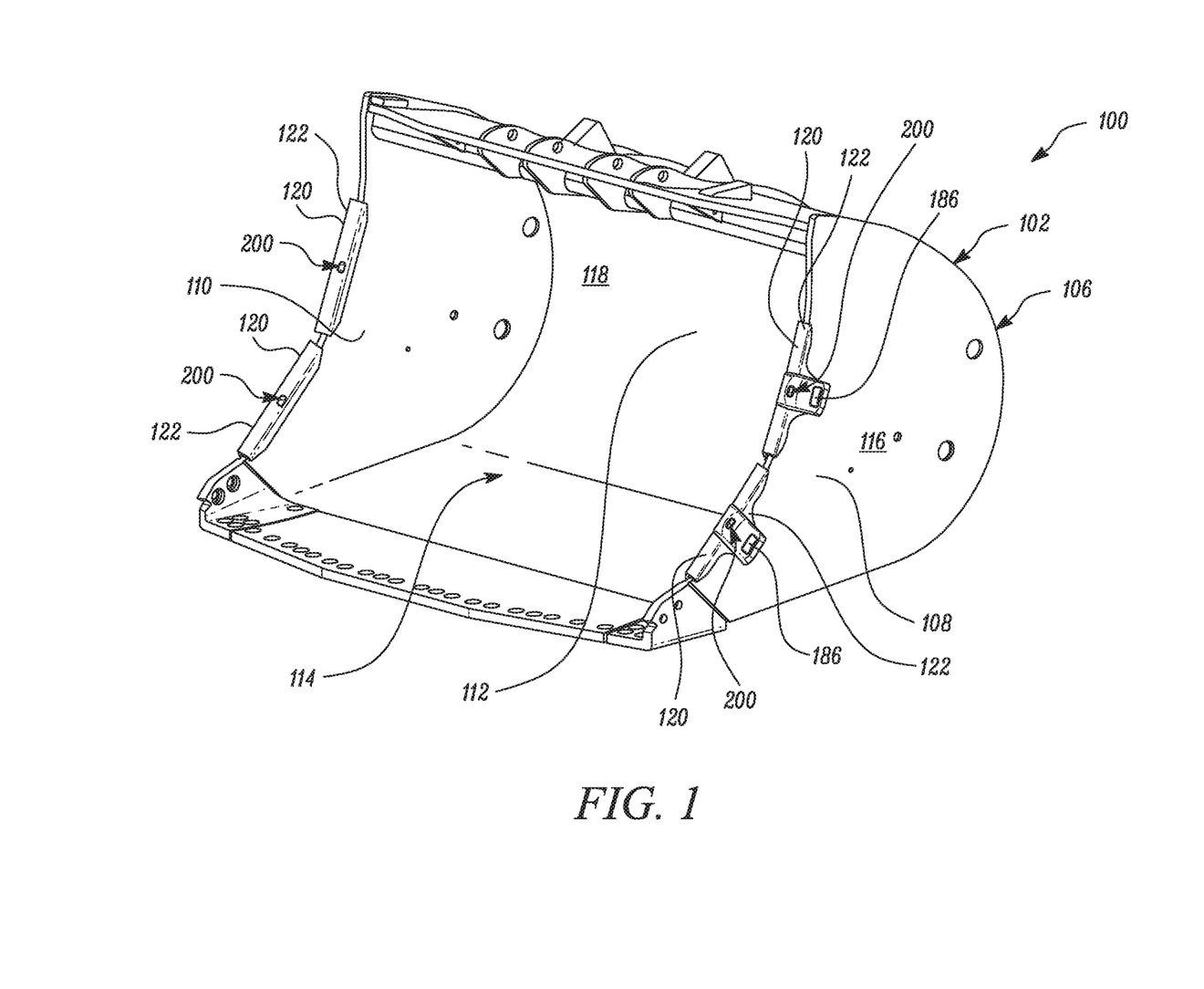
FIG. 1 is a perspective view of a work tool assembly having a work tool and one or more wear members coupled with the work tool, in accordance with an embodiment of the present disclosure.
Figure 2:
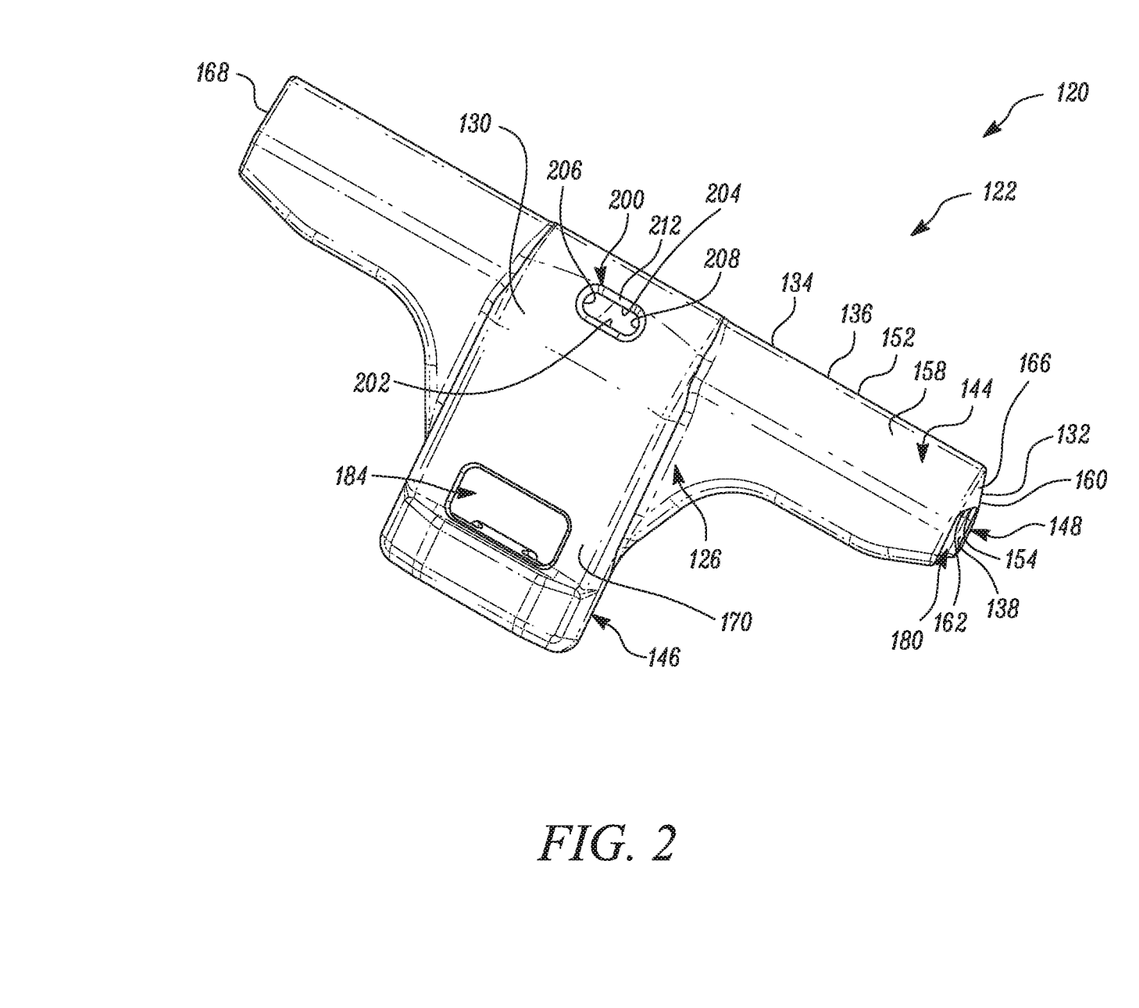
FIG. 2 is a perspective view of the wear member of the work tool assembly, in accordance with an embodiment of the present disclosure.

FIG. 1 shows an exemplary work tool assembly 100 in the form of a bucket assembly for an underground mining machine. The work tool assembly 100 may be coupled to a linkage assembly of a machine, and manipulated to perform various operations at a worksite. Examples of the machine may include, but not limited to, an excavator, a track type tractor, a wheel loader, or any other such earthmoving machine, a construction machine, a mining machine, an agricultural machine, etc.

The work tool assembly 100 includes a work tool 102 that performs various type of work such as digging, loading, grading, etc., at the worksite. Examples of the work tool 102 may include a bucket 106 (as shown in FIG. 1), a scraper blade, a snow plow, a ripper, or any other such work tool adapted to be coupled with any of the earthmoving machine, construction machine, agricultural machine, mining machine, etc., for performing work. As illustrated, the work tool 102 may include a pair of side members, for example a first side member 108 and a second side member 110, disposed spaced apart from each other and positioned substantially parallel to each other. The work tool 102 may also include a concave shaped member 112 disposed between the first side member 108 and the second member 110. The concave shaped member 112, the first side member 108, and the second side member 110 together define a chamber 114 to receive and store material.

The work tool assembly 100 further includes one or more wear members 120 coupled to the work tool 102 to protect the work tool 102 from wear and erosion. In some implementations, the wear member 120 may also facilitate digging and removal of earth along with protection against wear and erosion. In an exemplary embodiment, the wear member 120 may be a side protection member 122 configured to be coupled to the side members 108, 110 of the work tool 102 to protect the side members 108, 110 from wear and erosion. Although the wear member 120 is contemplated and described hereinafter as side protection member 122, it may be appreciated that the wear member 120 may be any other component such as, but not limited to, an adapter, a shroud, a tooth, or any other such member configured to be attached to the work tool 102.

Referring to FIGS. 2-5, the wear member 120 includes a body portion 126 having a first outer surface 130, a second outer surface 132, a wear surface 134 extending along a front edge 136 of the body portion 126, and a coupling surface 138 configured to abut the work tool 102 and facilitate an engagement of the wear member 120 with the work tool 102. The body portion 126 may further includes a base portion 144, a first leg portion 146 extending longitudinally from the base portion 144, and a second leg portion 148 extending longitudinally from the base portion 144 and disposed space apart and substantially parallel to the first leg portion 146.

Figure 4:
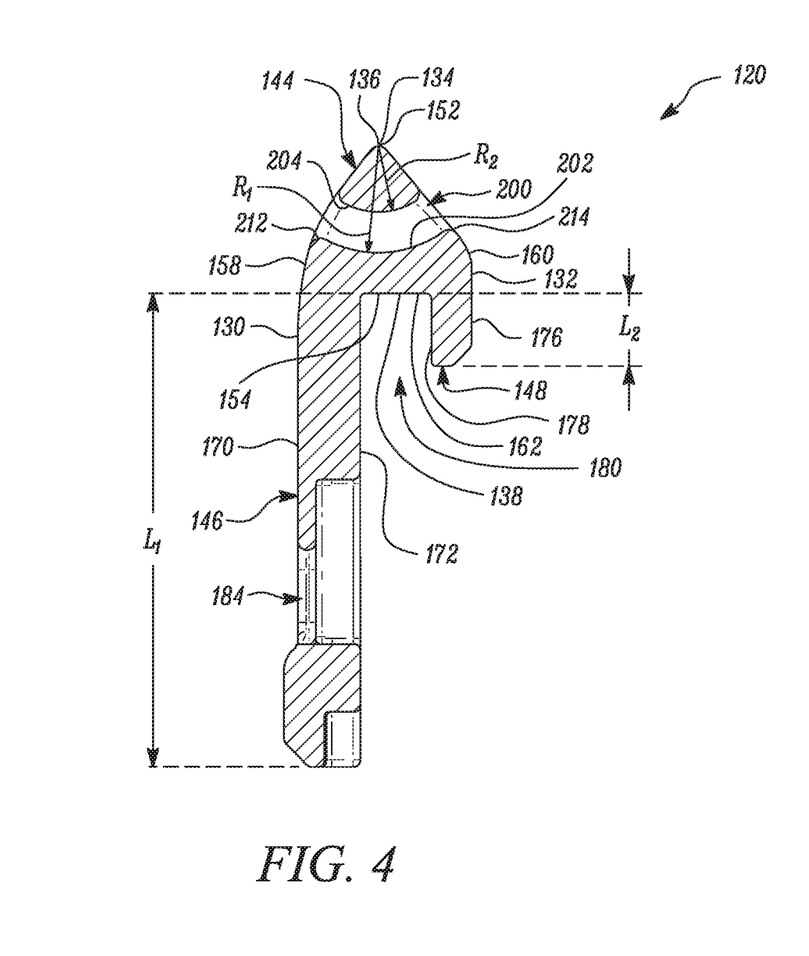
FIG. 4 is a sectional side view of the wear member of the work tool assembly, in accordance with an embodiment of the present disclosure.
Figure 5:
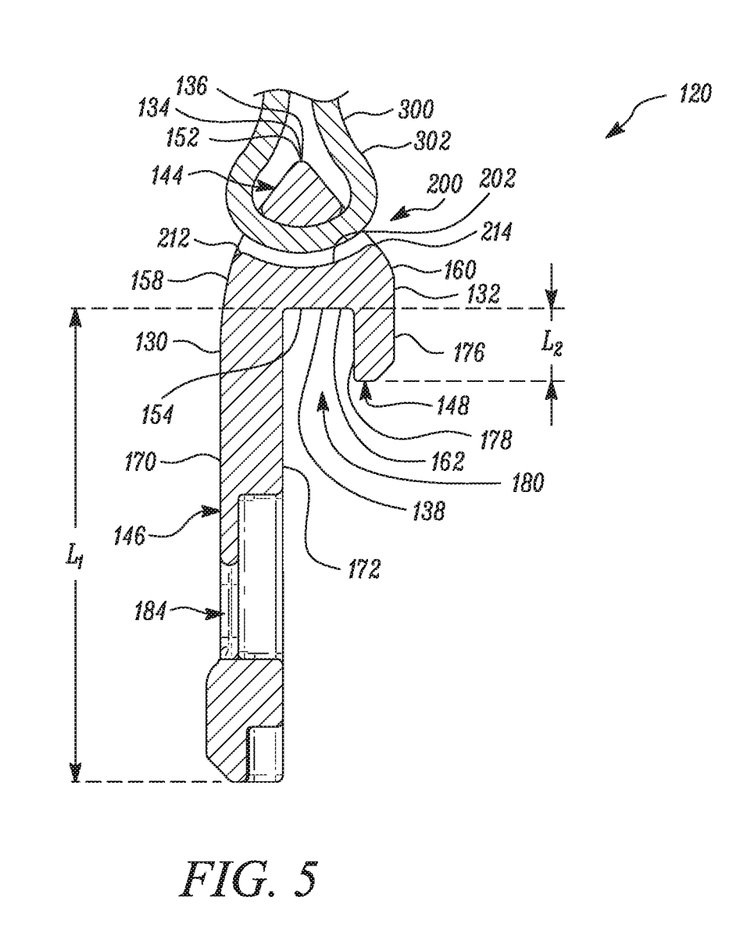
FIG. 5 is sectional side view of the wear member coupled with a lifting tool, in accordance with an embodiment of the present disclosure.

The base portion 144 includes a first longitudinal end 152, a second longitudinal end 154, a first surface 158 extending between the first longitudinal end 152 and the second longitudinal end 154, a second surface 160 extending between the first longitudinal end 152 and the second longitudinal end 154 and disposed opposite to the first surface 158, and a back surface 162 disposed at the second longitudinal end 154. The first surface 158 and the second surface 160 converge towards each other in a longitudinal direction away from the second longitudinal end 154 and towards the first longitudinal end 152. Therefore, in an embodiment, the base portion 144 may include a substantially delta shaped structure (as shown in FIGS. 4 and 5), and the back surface 162 disposed at the second longitudinal end 154 forms a base of the delta shaped structure. The first longitudinal end 152 of the base portion 144 defines the front edge 136 of the body portion 126, and also defines the wear surface 134 of the wear member 120. The base portion 144 further includes a first lateral end 166 and a second lateral end 168. The front edge 136 and the wear surface 134 extend between the first lateral end 166 and the second lateral end 168 in a lateral direction of the wear member 120. Also, in certain embodiments, an extension of the base portion 144 between the first lateral end 166 and the second lateral end 168 may be larger than an extension of base portion 144 between the first longitudinal end 152 and the second longitudinal end 154. Further, in an assembly of the wear member 120 with the work tool 102, the base portion 144 extends outwardly from an edge of the work tool 102. As illustrated, the base portion 144 extends outwardly from an edge defined by one of the pair of side members, for example the first side member 108, of the work tool 102.

The first leg portion 146 and the second leg portion 148, each extend from the back surface 162 of the base portion 144, and protrude away from the back surface 162 in the longitudinal direction. In an embodiment, a length 11' (shown in FIG. 4) of the first leg portion 146 is greater than a length 12' (shown in FIG. 4) of the second leg portion 148. In certain implementations, the first leg portion 146 is configured to abut an outer surface 116 (shown in FIG. 1) of the work tool 102, while the second leg portion 148 is configured to abut an inner surface 118 of the work tool 102.

Figure 3:
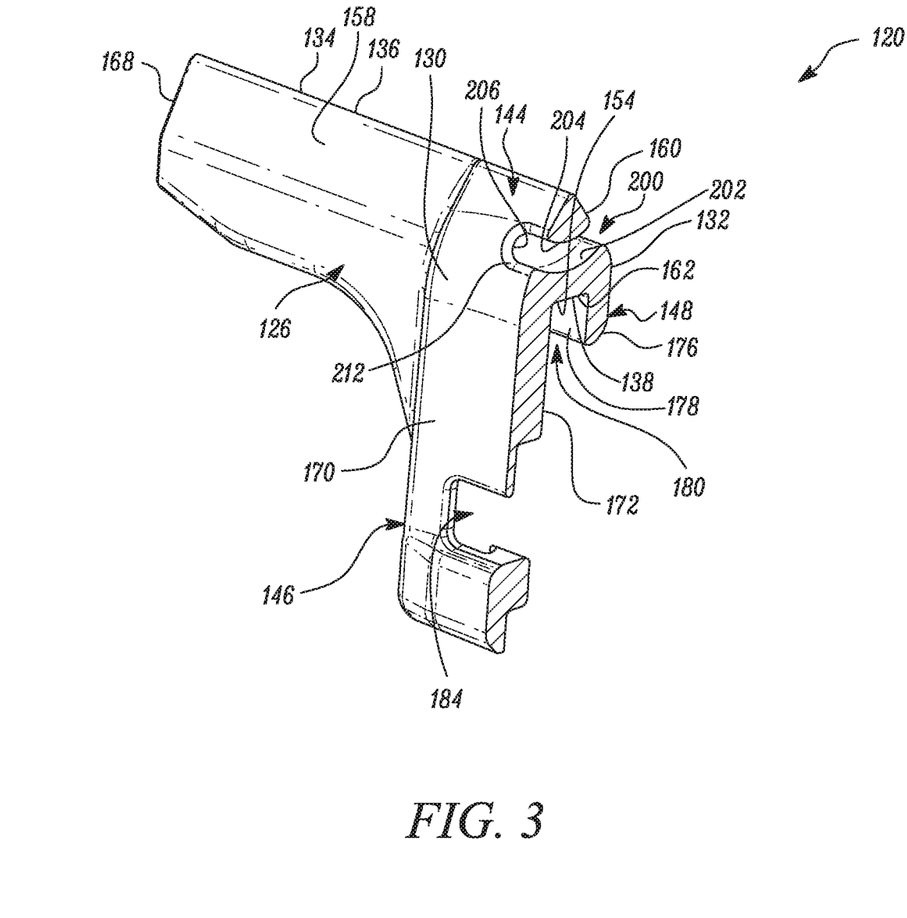
FIG. 3 is a sectional perspective view of the wear member of the work tool assembly, in accordance with an embodiment of the present disclosure.

Referring to FIGS. 3 and 4, the first leg portion 146 includes an outer surface 170 and an inner surface 172 disposed opposite to the outer surface 170 and extending substantially parallel to the outer surface 170. In an assembly of the wear member 120 with the work tool 102, the outer surface 170 of the first leg portion 146 may be disposed outside the chamber 114 and exposed to an ambient, while the inner surface 172 of the first leg portion 146 may abut the outer surface 116 of the work tool 102. Similar to the first leg portion 146, the second leg portion 148 may include an outer surface 176 and an inner surface 178 disposed opposite to the outer surface 176 and extending substantially parallel to the outer surface 176. In an assembly of the wear member 120 with the work tool 102, the outer surface 176 of the second leg portion 148 may be disposed inside the chamber 114 and exposed to the ambient, while the inner surface 178 of the second leg portion 148 may abut the inner surface 118 of the work tool 102. Therefore, the second leg portion 148 may be disposed inside the chamber 114 of the work tool 102 such as the bucket 106.

As the first leg portion 146 and the second leg portion 148 are disposed spaced apart from each other, a cavity 180 is defined between the first leg portion 146 and the second leg portion 148. The cavity 180 is configured to receive a portion of the work tool 102, for example, a portion of the first side member 108 of the work tool 102 to facilitate a coupling of the wear member 120 to the work tool 102. In an assembly of the work tool 102 and the wear member 120, an edge of first side member 108 may abut the back surface 162 of the base portion 144 i.e., the coupling surface 138 of the body portion 126.

The body portion 126 may further define an opening 184 to receive a connector 186 (shown in FIG. 1) to attach the wear member 120 with the work tool 102. The connector 186 is configured to hold the wear member 120 with the work tool 102. The connector 186 may include fasteners, adapters, or any other locking mechanism known in the art. In an embodiment, the opening 184 is defined by the first leg portion 146, and extends from the outer surface 170 of the first leg portion 146 to the inner surface 172 of the first leg portion 146.

Further, as illustrated, the outer surface 170 of the first leg portion 146 and the first surface 158 of the base portion 144 together form the first outer surface 130 of the body portion 126, while the outer surface 176 of the second leg portion 148 and the second surface 160 of the base portion 144 together constitute the second outer surface 132 of the body portion 126. Also, the inner surface 172 of the first leg portion 146, the inner surface 178 of the second leg portion 148, and the back surface 162 of the base portion 144 together define the coupling surface 138 of the body portion 126. Therefore, in an assembly of the wear member 120 with the work tool 102, the coupling surface 138 abuts or engages with the work tool 102, and therefore facilitate an engagement of the wear member 120 with the work tool 102.

Referring to FIGS. 1-4, the wear member 120 further includes a lifting passage 200 that is configured to allow a lifting tool 300 (shown in FIG. 5) to extend through the body portion 126 and facilitates lifting of the wear member 120. Referring to FIGS. 3 and 4, the lifting passage 200 extends from the first outer surface 130 to the second outer surface 132, and is disposed between the wear surface 134 and the coupling surface 138. In an embodiment, the lifting passage 200 is positioned adjacent the wear surface 134. As shown, in certain embodiments, the lifting passage 200 may be formed within the base portion 144. In such a case, the lifting passage 200 may extend from the first surface 158 to the second surface 160 through a thickness of the base portion 144. The lifting passage 200 may be a curved passage having an arcuate cross-section, and having a first wall 202 extending from the first surface 158 i.e., the first outer surface 130 to the second surface 160 i.e., the second outer surface 132. The first wall 202 may be an arcuate wall having a first radius of curvature 'R1' (shown in FIG. 4) extending in a direction of the wear surface 134. Therefore, the first wall 202 includes a concave shape having a concavity that is directed towards the wear surface 134 or the first longitudinal end 152 of the base portion 144 i.e., the front edge 136.

The lifting passage 200 may further include a second wall 204 disposed spaced apart and substantially parallel to the first wall 202. The first wall 202 is disposed proximate to the back surface 162 i.e., the coupling surface 138 relative to the second wall 204. Similar to the first wall 202, the second wall 204 may extend from the first surface 158 i.e., the first outer surface 130 to the second surface 160 i.e., the second outer surface 132. The second wall 204 may be disposed relatively proximate to the front edge 136 or the wear surface 134 as compared to a distance of the first wall 202 relative to the front edge 136 or the wear surface 134 in the longitudinal direction of the wear member 120. The second wall 204 may be an arcuate wall having a second radius of curvature 'R2' extending in the direction of the wear surface 134. Therefore, the second wall 204 may include a concave shape having a concavity that is directed towards the wear surface 134 or the first longitudinal end 152 of the base portion 144 i.e., the front edge 136. Although the first wall 202 and the second wall 204 are contemplated as curved walls, it may be appreciated that the first wall 202 and the second wall 204 may be flat walls.

The lifting passage 200 may further include a first curved wall 206 (shown in FIG. 3) and a second curved wall 208 (shown in FIG. 2) spaced apart from the first curved wall 206 and extending substantially parallel to the first curved wall 206. The first curved wall 206 and the second curved wall 208, each may extend from the first surface 158 i.e., the first outer surface 130 to the second surface 160 i.e., the second outer surface 132, and may connect the first wall 202 to the second wall 204. Therefore, the first wall 202 and the second wall 204 are connected to each other by the first curved wall 206 and the second curved wall 208. The lifting passage 200 may further define a pair of beveled edges, for example a first beveled edge 212 (shown in FIGS. 2 and 4) defined with the first outer surface 130 of the body portion 126 i.e., with the first surface 158 of the base portion 144, and a second beveled edge 214 defined with the second outer surface 132 of the body portion 126 i.e., with the second surface 160 of the base portion 144. As shown, the first beveled edge 212 may be disposed at an interface of each of the first wall 202, the second wall 204, the first curved wall 206, the second curved wall 208 with the first outer surface 130. Similarly, the second beveled edge 214 may be disposed at an interface of each of the first wall 202, the second wall 204, the first curved wall 206, the second curved wall 208 with the second outer surface 132. In an embodiment, both the first beveled edge 212 and the second beveled edge 214 have a same radius of curvature.

INDUSTRIAL APPLICABILITY

During operation of the machine at the worksite, the work tool assembly 100 of the machine is manipulated to perform a work such as a digging of soil, a lifting of soil, etc. For performing the work, the work tool assembly 100 may encounter debris and may be subject to various forces of operation, which may result in wear and erosion of the work tool assembly 100. Generally, one or more of the wear members 120 are attached to the work tool 102 for protecting the work tool 102 from wear, and thereby prolonging a useful life of the work tool 102. However, as the wear member 120 encounters the debris and forces, the wear member 120 gets damaged, and may need to be replaced to ensure smooth operation of the work tool assembly 100, and to ensure protection of the work tool 102 from wear and erosion. To facilitate removal of the wear member 120, the lifting tool 300 such as a lifting strap 302 may be utilized. To facilitate a disengagement and a lifting of the wear member 120, one end of the lifting strap 302 is connected to a hook of a crane, while other end of the lifting strap 302 is inserted through the lifting passage 200, and connected to the hook. In this manner, the wear member 120 is coupled with the hook of the crane. Thereafter, the wear member 120 is disengaged from the work tool 102 by removing or disengaging the connector 186. Subsequently, the wear member 120 is transported to another location by operating the crane. Similarly, for coupling a new wear member, such as wear member 120, with the work tool 102, the lifting strap 302 is inserted through the lifting passage 200, and thereby coupled and lifted with the crane. The new wear member 120 is positioned at an appropriate position on the work tool 102, such as on the first side member 108, and engaged with the work tool 102 by inserting a portion of the work tool 102, for example a portion of the first side member 108 into the cavity 180 of the body portion 126. Thereafter, the new wear member 120 may be coupled with the work tool 102 by the connector 186. In this manner, the lifting passage 200 facilitates a lifting and transportation of the new wear member 120. Further, as the lifting passage 200 is formed within the body portion 126, and does not extend outwardly as a protrusion, the lifting passage 200 may facilitate a lifting of the wear member 120 throughout a useful life of the wear member 120. Further, the beveled edges 212, 214 of the lifting passage 200 also prevents cutting of the lifting tool 300 such as the lifting strap 302 by otherwise sharp edges of a lifting passage.

What is claimed is:

1. A wear member for attachment to a work tool, the wear member comprising:
   a body portion configured to be coupled to the work tool, the body portion including a first outer surface, a second outer surface positioned opposite the first outer surface, a coupling surface configured to engage the work tool, and a wear surface disposed along an entirety of a front edge of the body portion; and
   a lifting passage extending through the body portion from the first outer surface to the second outer surface and positioned between the coupling surface and a linear portion of the front edge defining the wear surface,
   wherein the linear portion forms a front-most portion of the wear member,
   wherein the linear portion is linear in a top elevational view of the wear member and extends linearly more than a length of the lifting passage and from a first lateral end of the body portion to a second lateral end of the body portion opposite the first lateral end,
   wherein, in the top elevational view of the wear member, a first distance of the body portion from the first lateral end to the second lateral end is greater than a second distance from the front edge of the body portion to a rear edge of the body portion opposite the front edge, the rear edge forming a rear-most portion of the wear member,
   wherein the body portion has a first leg portion and a second leg portion that extend parallel to each other, the second leg portion being shorter than the first leg portion,
   wherein the lifting passage is configured to allow a lifting tool strap to extend through the body portion and facilitate lifting of the wear member,
   wherein the lifting passage includes a first wall at the first outer surface of the body portion and a second wall spaced apart from the first wall at the second outer surface of the body portion,
   wherein the first wall and the second wall of the lifting passage are connected to each other by a first curved wall and a second curved wall that are curved in a side cross-section of the wear member, and
   wherein the first wall of the lifting passage defines a first beveled edge with the first outer surface of the body portion, and the second wall of the lifting passage defines a second beveled edge with the second outer surface of the body portion.

2. The wear member of claim 1, wherein the lifting passage is positioned adjacent the wear surface.

3. The wear member of claim 1, wherein the lifting passage is arcuate in the side cross-section with the first curved wall having a first radius of curvature and the second curved wall having a second radius of curvature, the first radius of curvature and the second radius of curvature extend in a direction from the wear surface.

4. The wear member of claim 1, wherein the body portion defines an opening to receive a connector to couple the wear member to the work tool.

5. The wear member of claim 1, wherein the body portion includes a base portion, the first leg portion extending longitudinally from the base portion, and the second leg portion disposed substantially parallel and spaced apart from the first leg portion to define a cavity therebetween for receiving the work tool.

6. The wear member of claim 1, wherein the wear member is a side protection member.

7. The wear member of claim 1, wherein the body defines a coupling surface opposite the front edge of the body portion and between the first leg portion and the second leg portion, wherein a third distance from the coupling surface to the rear edge of the body portion is greater than a fourth distance from the coupling surface to the front edge of the body.

8. The wear member of claim 1, wherein a length of the front edge of the body portion is greater than a length of the rear edge of the body portion.

9. A work tool assembly, comprising:
a work tool; and
a wear member coupled to the work tool, the wear member including:
a body portion including a first outer surface, a second outer surface positioned opposite the first outer surface, a coupling surface engaged with the work tool, and a wear surface disposed along an entirety of a front edge of the body portion; and
a lifting passage extending through the body portion from the first outer surface to the second outer surface and positioned between the coupling surface and a linear portion of the front edge defining the wear surface, the lifting passage being elongate in a top elevational view of the wear member so as to have a length greater than a width,
wherein the linear portion forms a front-most portion of the wear member,
wherein the linear portion is linear in the top elevational view of the wear member and extends linearly more than the length of the lifting passage and from a first lateral end of the body portion to a second lateral end of the body portion opposite the first lateral end,
wherein, in the top elevational view of the wear member, a first distance of the body portion from the first lateral end to the second lateral end is greater than a second distance from the front edge of the body portion to a rear edge of the body portion opposite the front edge, the rear edge forming a rear-most portion of the wear member,
wherein convergence of the first outer surface and the second outer surface at the front edge forms a point in a side view of the wear member, and
wherein the lifting passage is positioned adjacent the front edge such that the lifting passage is closer to the front edge than to the rear edge of the body portion opposite the front edge.

10. The work tool assembly of claim 9, wherein the lifting passage is configured to allow a lifting tool to extend through the body portion and facilitate lifting of the wear member.

11. The work tool assembly of claim 9, wherein the lifting passage includes a first wall and a second wall spaced apart and parallel to the first wall, wherein the first wall and the second wall are connected to each other by a first curved wall and a second curved wall.

12. The work tool assembly of claim 9, wherein the lifting passage defines a first beveled edge with the first outer surface and a second beveled edge with the second outer surface.

13. The work tool assembly of claim 11, wherein the lifting passage is arcuate in a side cross-section with the first curved wall having a first radius of curvature and the second curved wall having a second radius of curvature, the first radius of curvature and the second radius of curvature extend in a direction from the wear surface.

14. The work tool assembly of claim 9, wherein the body portion defines an opening to receive a connector to couple the wear member to the work tool.

15. The work tool assembly of claim 9, wherein the body portion includes a base portion, a first leg portion extending longitudinally from the base portion, and a second leg portion disposed substantially parallel and spaced apart from the first leg portion to define a cavity therebetween for receiving the work tool.

16. The work tool assembly of claim 15, wherein a length of the first leg portion is greater than a length of the second leg portion.

17. The work tool assembly of claim 9, wherein the wear member is a side protection member.

* * * * *